United States Patent
Sztuk et al.

(10) Patent No.: US 12,536,755 B2
(45) Date of Patent: Jan. 27, 2026

(54) GAZE-BASED SUPER-RESOLUTION FOR EXTENDED REALITY DEVICES

(71) Applicant: Meta Platforms Technologies, LLC, Menlo Park, CA (US)

(72) Inventors: Sebastian Sztuk, Virum (DK); Ilya Brailovskiy, Fremont, CA (US); Steven Paul Lansel, Apopka, FL (US); Grant Kaijuin Yang, San Bruno, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 108 days.

(21) Appl. No.: 18/398,678

(22) Filed: Dec. 28, 2023

(65) Prior Publication Data

US 2024/0249478 A1 Jul. 25, 2024

Related U.S. Application Data

(60) Provisional application No. 63/480,958, filed on Jan. 21, 2023.

(51) Int. Cl.
*G06T 19/00* (2011.01)
*G06T 3/4053* (2024.01)

(52) U.S. Cl.
CPC .......... *G06T 19/006* (2013.01); *G06T 3/4053* (2013.01)

(58) Field of Classification Search
CPC ................................................... G06T 19/006
See application file for complete search history.

(56) References Cited

U.S. PATENT DOCUMENTS

2019/0026864 A1* 1/2019 Chen ..................... G06T 3/4053
2019/0096035 A1* 3/2019 Li .......................... G06N 3/063
(Continued)

FOREIGN PATENT DOCUMENTS

EP 4120238 A1 1/2023

OTHER PUBLICATIONS

ANONYMOUS., "Foveated Rendering," Wikipedia, Nov. 23, 2022, [Retrieved on Mar. 19, 2024], 3 Pages, Retrieved from the Internet URL: https://en.wikipedia.org/w/index.php?t%20itle=Foveated%20rendering oldid=1123398839.
(Continued)

*Primary Examiner* — Jeffery A Brier
(74) *Attorney, Agent, or Firm* — Greenberg Traurig, LLP

(57) ABSTRACT

A method implemented by a computing device includes rendering on displays of a computing device an extended reality (XR) environment, and determining a context of the XR environment with respect to a user. Determining the context includes determining characteristics associated with an eye of the user with respect to content displayed. The method includes generating, based on the characteristics associated with the eye, a foveated map including a plurality of foveal regions. The plurality of foveal regions includes a plurality of zones each corresponding to a low-resolution area of the content for the respective zone. The method includes inputting one or more of the plurality of zones into a machine-learning model trained to generate a super-resolution reconstruction of the foveated map based on regions of interest identified within the one or more of the plurality of zones, and outputting, by the machine-learning model, the super-resolution reconstruction of the foveated map.

20 Claims, 12 Drawing Sheets

(56) References Cited

U.S. PATENT DOCUMENTS

2020/0098139 A1     3/2020   Kaplanyan et al.
2022/0262079 A1     8/2022   Croxford et al.

OTHER PUBLICATIONS

International Preliminary Report on Patentability for International Application No. PCT/US2024/012294, mailed Jul. 31, 2025, 11 pages.
International Search Report and Written Opinion for International Application No. PCT/US2024/012294, mailed Apr. 2, 2024, 15 pages.

* cited by examiner

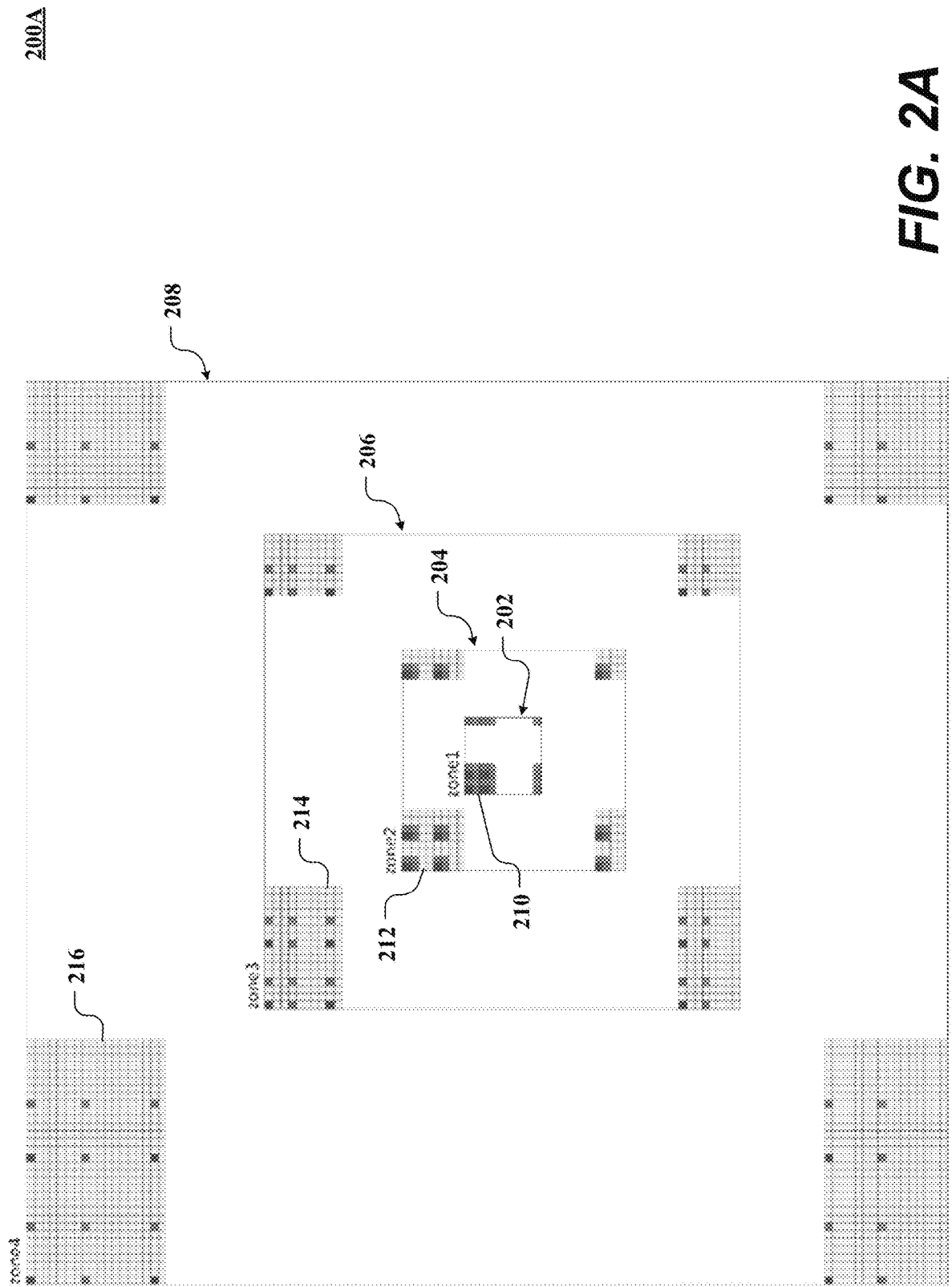

GAZE-BASED SUPER-RESOLUTION FOR EXTENDED REALITY DEVICES

PRIORITY

This application claims the benefit under 35 U.S.C. § 119(e) of U.S. Provisional Patent Application No. 63/480,958, filed 21 Jan. 2023, which is incorporated herein by reference.

TECHNICAL FIELD

This disclosure relates generally to extended reality devices, and, more specifically, to techniques for gaze-based super-resolution for extended reality devices.

BACKGROUND

An extended reality (XR) environment may generally include a real-world environment that includes XR content overlaying one or more features of the real-world environment and/or a fully immersive virtual environment in which a user may navigate and experience using one or more user avatars. In typical XR systems, image data may be rendered on, for example, a robust head-mounted display (HMD) that may be coupled through a physical wired or wireless connection to a base graphics generation device responsible for generating the image data. To reduce power consumption and system costs, in some instances, XR systems may include low-resolution cameras for capturing the real-world environment. However, low-resolution cameras may adversely impact image content resolution. It may be thus useful to provide techniques to improve XR systems.

SUMMARY OF CERTAIN EMBODIMENTS

The present embodiments include techniques for providing gaze-based super-resolution for image content rendered by extended reality (XR) devices. In certain embodiments, a computing device configured to be worn by a user may render on one or more displays of the computing device an extended reality (XR) environment. In certain embodiments, the computing device may then determine a context of the XR environment with respect to the user. For example, in one embodiment, the computing device may determine the context by determining one or more characteristics associated with at least one eye of the user with respect to content displayed within the XR environment. In certain embodiments, the computing device may determine a context of the XR environment with respect to the user. In certain embodiments, the computing device may determine the context of the XR environment with respect to the user based on a prediction of a location of at least one eye of the user with respect to the content over a next few image frames to be displayed. In another embodiment, the computing device may determine the context of the XR environment with respect to the user based on a depth from eye vector convergence.

In certain embodiments, the computing device may then generate, based on the one or more characteristics associated with the at least one eye of the user, a foveated map. For example, in certain embodiments, the foveated map may include a number of foveal regions, in which each of the number of foveal regions includes a plurality of zones each corresponding to a low-resolution area of the content for the respective zone. In certain embodiments, the computing device may then input one or more of the plurality of zones into a machine-learning model trained to generate a super-resolution reconstruction of the foveated map based on regions of interest identified within the one or more of the plurality of zones. In one embodiment, the one or more of the plurality of zones corresponds to an approximate 30°× 30° field of view (FOV) central foveal region of the user.

In certain embodiments, the machine-learning model may include a convolutional neural network (CNN), a deep convolutional neural network (DCNN), a vision transformer (ViT), or generative adversarial network (GAN). In certain embodiments, the computing device may then output, by the machine-learning model, the super-resolution reconstruction of the foveated map. In certain embodiments, the computing device may then cause the XR display device to display the one or more image frames utilizing the super-resolution reconstruction of the foveated map. In certain embodiments, the machine-learning model may be further trained to generate a multi-frame temporal super-resolution reconstruction of the foveated map based on the regions of interest identified within the one or more of the plurality of zones. For example, the multi-frame temporal super-resolution reconstruction may be applied to reconstruct textural details of the foveated map.

The embodiments disclosed herein are only examples, and the scope of this disclosure is not limited to them. Certain embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 2A and 2B illustrate example sensor readouts of an image sensor.

DESCRIPTION OF EXAMPLE EMBODIMENTS

Figure 1A:
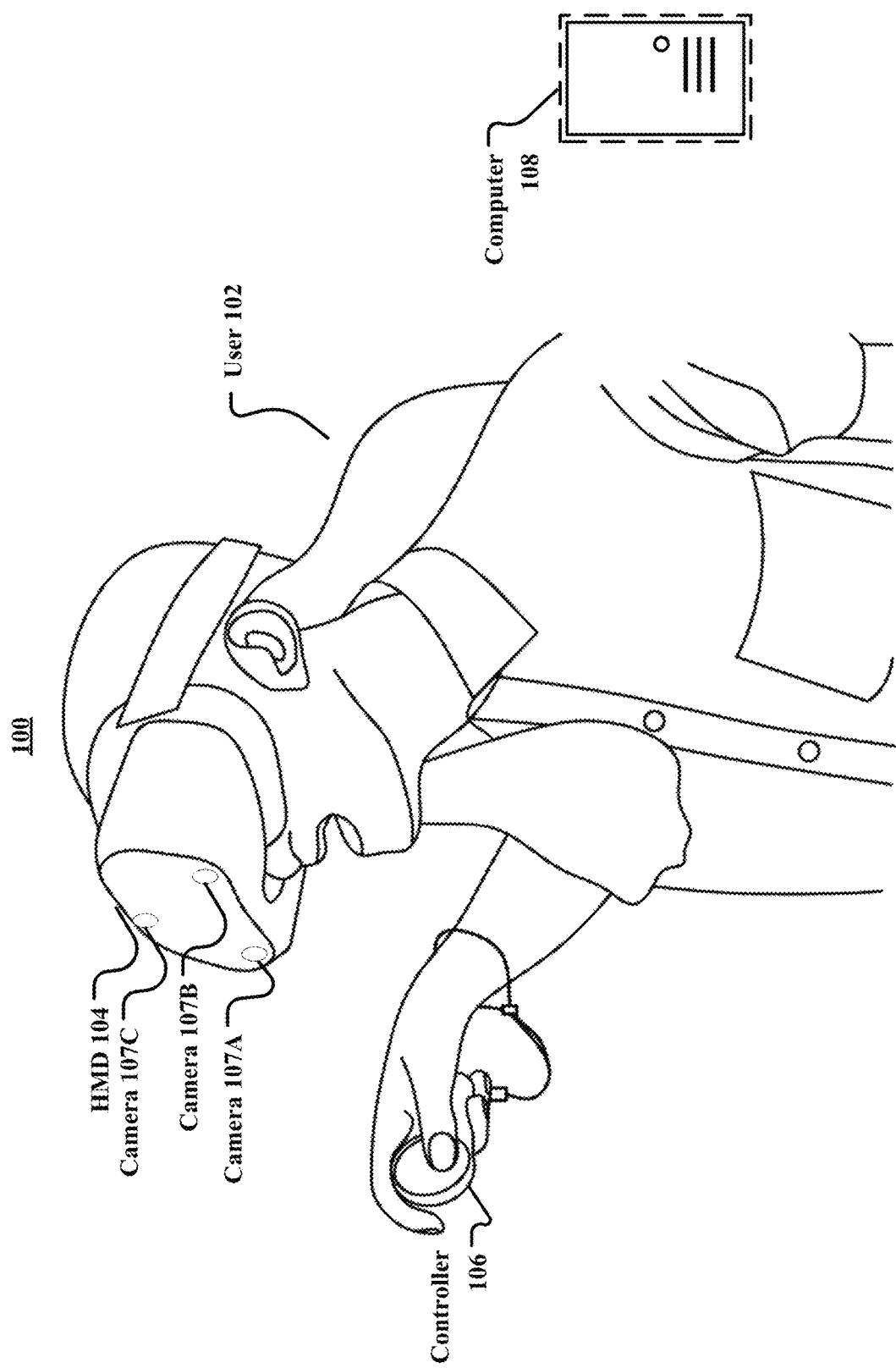
FIG. 1A illustrates an example of an extended reality (XR) display device.

An extended reality (XR) environment may generally include a real-world environment that includes XR content overlaying one or more features of the real-world environment and/or a fully immersive virtual environment in which a user may navigate and experience using one or more user avatars. In typical XR systems, image data may be rendered on, for example, a robust head-mounted display (HMD) that may be coupled through a physical wired or wireless connection to a base graphics generation device responsible for generating the image data. To reduce power consumption and system costs, in some instances, XR systems may include low-resolution cameras for capturing the real-world environment. However, low-resolution cameras may adversely impact image content resolution. It may be thus useful to provide techniques to improve XR systems.

Accordingly, the present embodiments include techniques for providing gaze-based super-resolution for image content rendered by extended reality (XR) devices. In certain embodiments, a computing device configured to be worn by a user may render on one or more displays of the computing device an extended reality (XR) environment. In certain embodiments, the computing device may then determine a context of the XR environment with respect to the user. For example, in one embodiment, the computing device may determine the context by determining one or more characteristics associated with at least one eye of the user with respect to content displayed within the XR environment. In certain embodiments, the computing device may determine a context of the XR environment with respect to the user by determining one or more of a head pose of the user or an eye gaze of the user. In certain embodiments, the computing device may determine the context of the XR environment with respect to the user based on a prediction of a location of at least one eye of the user with respect to the content over a next few image frames to be displayed. In another embodiment, the computing device may determine the context of the XR environment with respect to the user based on a depth from eye vector convergence.

In certain embodiments, the computing device may then generate, based on the one or more characteristics associated with the at least one eye of the user, a foveated map. For example, in certain embodiments, the foveated map may include a number of foveal regions, in which each of the number of foveal regions includes a plurality of zones each corresponding to a low-resolution area of the content for the respective zone. In certain embodiments, the computing device may then input one or more of the plurality of zones into a machine-learning model trained to generate a super-resolution reconstruction of the foveated map based on regions of interest identified within the one or more of the plurality of zones. In one embodiment, the one or more of the plurality of zones corresponds to an approximate 30°× 30° field of view (FOV) central foveal region of the user.

In certain embodiments, the machine-learning model may include a convolutional neural network (CNN), a deep convolutional neural network (DCNN), a vision transformer (ViT), or generative adversarial network (GAN). In certain embodiments, the computing device may then output, by the machine-learning model, the super-resolution reconstruction of the foveated map. In certain embodiments, the computing device may then cause the XR display device to display the one or more image frames utilizing the super-resolution reconstruction of the foveated map. In certain embodiments, the machine-learning model may be further trained to generate a multi-frame temporal super-resolution reconstruction of the foveated map based on the regions of interest identified within the one or more of the plurality of zones. For example, the multi-frame temporal super-resolution reconstruction may be applied to reconstruct textural details of the foveated map.

As used herein, "extended reality" may refer to a form of electronic-based reality that has been manipulated in some manner before presentation to a user, including, for example, virtual reality (VR), augmented reality (AR), mixed reality (MR), hybrid reality, simulated reality, immersive reality, holography, or any combination thereof. For example, "extended reality" content may include completely computer-generated content or partially computer-generated content combined with captured content (e.g., real-world images). In some embodiments, the "extended reality" content may also include video, audio, haptic feedback, or some combination thereof, any of which may be presented in a single channel or in multiple channels (such as stereo video that produces a three-dimensional (3D) effect to the viewer). Furthermore, as used herein, it should be appreciated that "extended reality" may be associated with applications, products, accessories, services, or a combination thereof, that, for example, may be utilized to create content in extended reality and/or utilized in (e.g., perform activities) an extended reality. Thus, "extended reality" content may be implemented on various platforms, including a head-mounted device (HMD) connected to a host computer system, a standalone HMD, a mobile device or computing system, or any other hardware platform capable of providing extended reality content to one or more viewers.

"Passthrough" is a feature that allows a user wearing an HMD to see his physical surroundings by displaying visual information captured by the HMD's front-facing cameras. To account for misalignment between the stereo cameras and the user's eyes and to provide parallax, the passthrough images are re-projected based on a 3D model representation of the physical surrounding. In one embodiment, the 3D model may provide the rendering system geometry information, and the images captured by the HMD's cameras are used as texture images. In another embodiment, the 3D information (e.g., depth information) may be utilized to apply a 2D warp to textures. For example, the 3D information of a scene may be utilized to re-project the camera images to account for misalignment from the cameras to the user's eyes, for example.

FIG. 1A illustrates an example of an extended reality (XR) display device 100 worn by a user 102. In certain embodiments, the extended reality (XR) display device 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1A, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical environment surrounding him, as his vision is shielded by the HMD 104. As such, the passthrough feature described herein is suited to provide the user with real-time visual information about his physical surroundings. The HMD 104 may comprise several external-facing cameras 107A-107C. In certain embodiments, cameras 107A-107B may be grayscale cameras and camera 107C may be an RGB camera. Although a number of cameras 107 are shown, extended reality (XR) display device 100 may include any number of cameras.

Figure 1B:
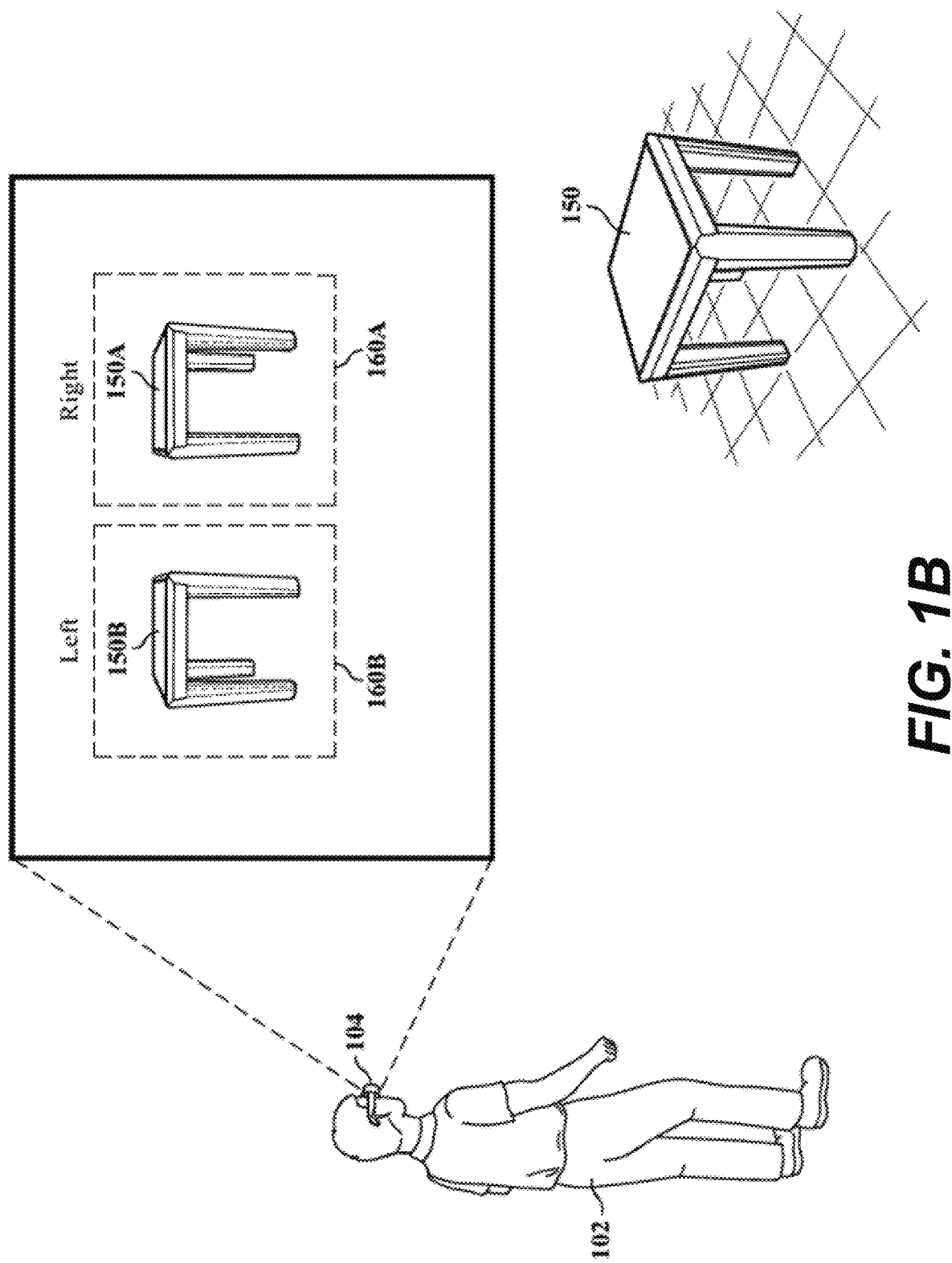
FIG. 1B illustrates an example of the passthrough feature.

FIG. 1B illustrates an example of the passthrough feature. A user 102 may be wearing an HMD 104, immersed within a virtual reality environment. A physical table 150 is in the physical environment surrounding the user 102. However, due to the HMD 104 blocking the vision of the user 102, the user 102 is unable to see the table 150 directly. To help the user perceive his physical surroundings while wearing the HMD 104, the passthrough feature captures information about the physical environment using, for example, the aforementioned external-facing cameras 107A-107C. While the HMD 104 has three external-facing cameras 107A-107C, any combination of the cameras 107A-107C may be used to perform the functions as described herein. For example, cameras 107A-107B may be used to perform one or more functions as described herein. In certain embodiments, the cameras 107A-107C may be used to capture images of the scene. The captured information may then be re-projected to the user 102 based on his viewpoints. In certain embodiments, for example, where the HMD 104 has a right display 160A for the user's right eye and a left display 160B for the user's left eye, the device 100 may individually render (1) a re-projected view 150A of the physical environment for the right display 160A based on a viewpoint of the user's right eye and (2) a re-projected view 150B of the physical environment for the left display 160B based on a viewpoint of the user's left eye.

Referring again to FIG. 1A, the HMD 104 may have external-facing cameras, such as the three forward-facing cameras 107A-107C shown in FIG. 1A. While only three forward-facing cameras 107A-107C are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video). As previously explained, although images captured by the forward-facing cameras 107A-107C may be directly displayed to the user 102 via the HMD 104, doing so would not provide the user with an accurate view of the physical environment since the cameras 107A-C cannot physically be located at the exact same location as the user's eyes. As such, the passthrough feature described herein uses a re-projection technique that may generate a 3D representation of the physical environment and then renders images based on the 3D representation from the viewpoints of the user's eyes.

The 3D representation may be generated based on depth measurements of physical objects observed by the cameras 107A-107C. Depth may be measured in a variety of ways. In certain embodiments, depth may be computed based on stereo images. For example, the three forward-facing cameras 107A-107C may share an overlapping field of view and be configured to capture images simultaneously. As a result, the same physical object may be captured by the cameras 107A-107C at the same time. For example, a particular feature of an object may appear at one pixel $p_A$ in the image captured by camera 107A, and the same feature may appear at another pixel $p_B$ in the image captured by camera 107B. As long as the depth measurement system knows that the two pixels correspond to the same feature, it could use triangulation techniques to compute the depth of the observed feature.

For example, based on the camera 107A's position within a 3D space and the pixel location of $p_A$ relative to the camera 107A's field of view, a line could be projected from the camera 107A and through the pixel $p_A$. A similar line could be projected from the other camera 107B and through the pixel $p_B$. Since both pixels are supposed to correspond to the same physical feature, the two lines should intersect. The two intersecting lines and an imaginary line drawn between the two cameras 107A and 107B form a triangle, which could be used to compute the distance of the observed feature from either camera 107A or 107B or a point in space where the observed feature is located. The same can be done between either of cameras 107A-107B and camera 107C.

In certain embodiments, the pose (e.g., position and orientation) of the HMD 104 within the environment may be suitable. For example, in order to render the appropriate display for the user 102 while he is moving about in a virtual environment, the device 100 may be suited to determine his position and orientation at any moment. Based on the pose of the HMD, the device 100 may further determine the viewpoint of either of the cameras 107A-107C or either of the user's eyes. In certain embodiments, the HMD 104 may be equipped with inertial-measurement units ("IMU"). The data generated by the IMU, along with the stereo imagery captured by the external-facing cameras 107A-107B, allow the device 100 to compute the pose of the HMD 104 using, for example, SLAM (simultaneous localization and mapping) or other suitable techniques.

In certain embodiments, the extended reality (XR) display device 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the device 100 may be able to capture an image of the predetermined pattern on the controller. Based on the observed orientation of those patterns, the system may compute the controller's position and orientation relative to the sensor or camera.

The extended reality (XR) display device 100 may further include a computer unit 108. The computer unit may be a stand-alone unit that is physically separate from the HMD 104, or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an extended reality (XR) display device 100 depends on the capabilities of its computer unit 108.

In certain embodiments, for example, where the computing unit 108 is a high-performance device, an embodiment of the passthrough feature may be designed as follows. Through the external-facing cameras 107A-107C of the HMD 104, a sequence of images of the surrounding physical environment may be captured. The information captured by the cameras 107A-107C, however, would be misaligned with what the user's eyes would capture since the cameras could not spatially coincide with the user's eyes (e.g., the cameras would be located some distance away from the user's eyes and, consequently, have different viewpoints). As such, simply displaying what the cameras captured to the user would not be an accurate representation of what the user should perceive.

Figure 2B:
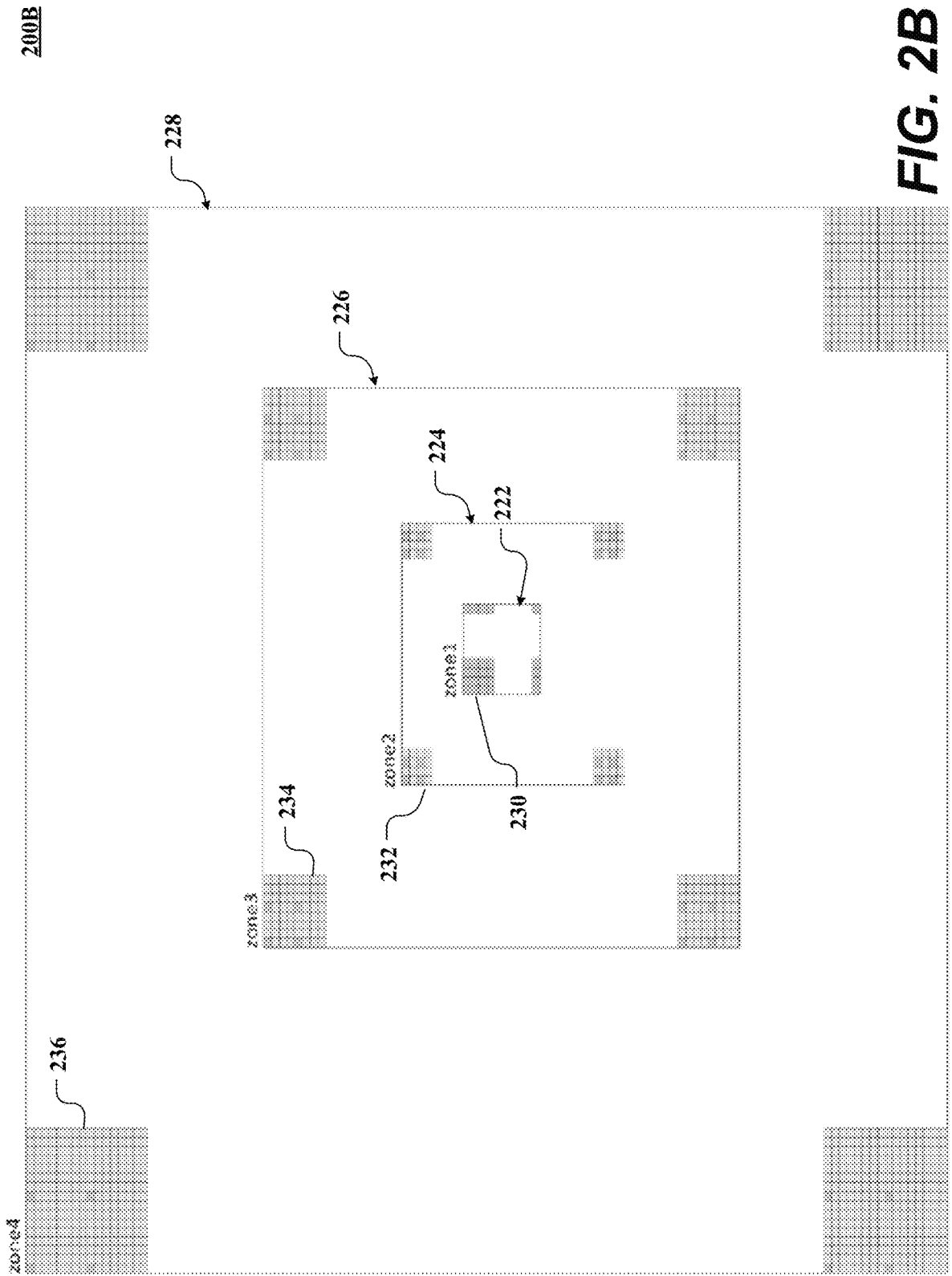

FIGS. 2A and 2B illustrate example sensor readouts of an image sensor, in accordance with particular embodiments. Referring first to FIG. 2A, an example sensor readout 200A is shown. In certain embodiments, the sensor readout 200A may include a plurality of zones 202, 204, 206, 208. As an example and not by way of limitation, the sensor readout 200A may include a first zone 202, a second zone 204, a third zone 206, and a fourth zone 208. Although a particular number of zones are shown, this disclosure contemplates a sensor readout that includes any number of zones in any suitable configuration. In certain embodiments, zone 1 202 may include a sensor resolution 210 that specifies the pattern of pixels to readout on an area of the image sensor. In certain embodiments, the sensor resolution 210 for zone 1 202 may be full resolution. In certain embodiments, zone 2 204 may include a sensor resolution 212 that specifies the pattern of pixels to readout on an area of the image sensor.

In certain embodiments, the sensor resolution 212 for zone 2 204 may be ½ resolution. In certain embodiments, zone 3 206 may include a sensor resolution 214 that specifies the pattern of pixels to readout on an area of the image sensor. In certain embodiments, the sensor resolution 214 may be ¼ resolution. In certain embodiments, zone 4 208 may include a sensor resolution 216 that specifies the pattern of pixels to readout on an area of the image sensor. In certain embodiments, the sensor resolution 216 may be ⅛ resolution. In certain embodiments, the sensor resolutions 210, 212, 214, 216 may specify one or more RGB pixels to be readout in a sensor readout 200A. In certain embodiments, an RGB camera may use the sensor readout 200A to readout the pixels specified to generate an output image as described herein. In certain embodiments, zone 1 202 may generate a first image, zone 2 204 may generate a second image, zone 3 206 may generate a third image, and zone 4 208 may generate a fourth image based on their respective sensor resolutions 210, 212, 214, 216.

In certain embodiments, an RGB camera may generate an output image using the sensor readout 200A and send the output image to an ISP for processing as described herein. In certain embodiments, the image sensor using the sensor readout 200A may output the active pixels specified by the sensor readout 200A. In certain embodiments, the frame ROI location and size may be programmable. In certain embodiments, while a uniform distribution of the pixels in the sensor resolution 210, 212, 214, 216 is shown, a non-uniform distribution may also be used for the sensor readout 200A. In certain embodiments, algorithms may be used to combine multiple pixels from a full sensor readout or the sensor readout 200A into a single pixel, such as through averaging.

Referring to FIG. 2B, another example sensor readout 200B is shown. In certain embodiments, the sensor readout 200B may include a plurality of zones 222, 224, 226, 228. As an example and not by way of limitation, the sensor readout 200B may include a first zone 222, a second zone 224, a third zone 226, and a fourth zone 228. Although a particular number of zones are shown, this disclosure contemplates a sensor readout that includes any number of zones in any suitable configuration. In certain embodiments, zone 1 222 may include a sensor resolution 230 that specifies the pattern of pixels to readout on an area of the image sensor. In certain embodiments, the sensor resolution 230 for zone 1 222 may be full resolution.

In certain embodiments, zone 2 224 may include a sensor resolution 232 that specifies the pattern of pixels to readout on an area of the image sensor. In certain embodiments, the sensor resolution 232 for zone 2 224 may be ½ resolution. In certain embodiments, zone 3 226 may include a sensor resolution 234 that specifies the pattern of pixels to readout on an area of the image sensor. In certain embodiments, the sensor resolution 234 may be ¼ resolution. In certain embodiments, zone 4 228 may include a sensor resolution 236 that specifies the pattern of pixels to readout on an area of the image sensor. In certain embodiments, the sensor resolution 236 may be ⅛ resolution. In certain embodiments, the sensor resolutions 230, 232, 234, 236 may specify one or more mono pixels to be readout in a sensor readout 200B. In certain embodiments, a mono camera may use the sensor readout 200B to readout the pixels specified to generate an output image as described herein.

In certain embodiments, zone 1 222 may generate a first image, zone 2 224 may generate a second image, zone 3 226 may generate a third image, and zone 4 228 may generate a fourth image based on their respective sensor resolutions 230, 232, 234, 236. In certain embodiments, a mono camera may generate an output image using the sensor readout 200B and send the output image to an ISP for processing as described herein. In certain embodiments, the image sensor using the sensor readout 200B may output the active pixels specified by the sensor readout 200B. In certain embodiments, the frame ROI location and size may be programmable. In certain embodiments, algorithms may be used to combine multiple pixels from a full sensor readout or the sensor readout 200B into a single pixel, such as through averaging.

Figure 3:
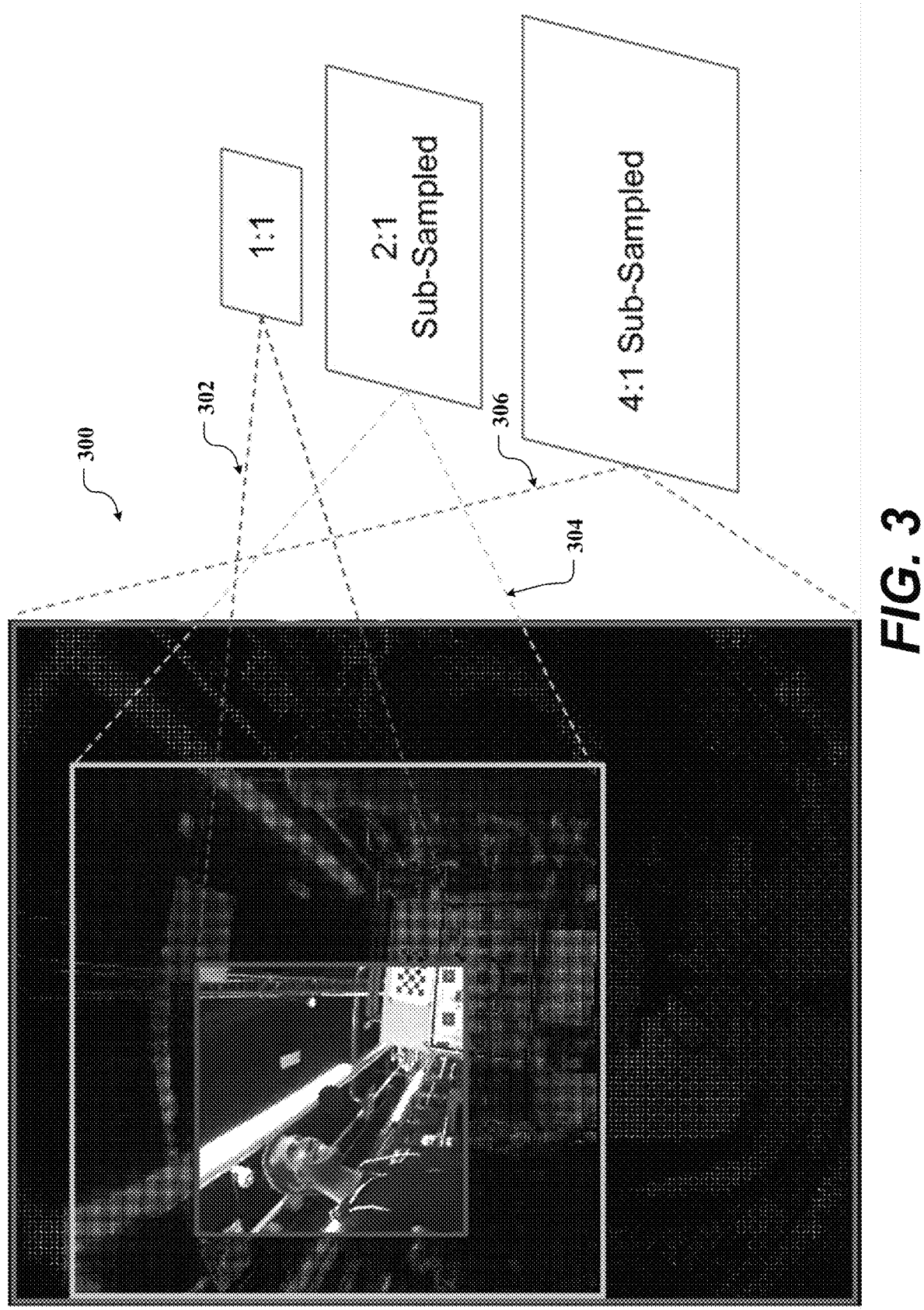
FIG. 3 illustrates an example image sectioned into a plurality of different zones.

FIG. 3 illustrates an example image sectioned into a plurality of different zones, in accordance with the presently disclosed embodiments. In certain embodiments, the image 300 may include a plurality of zones 302, 304, 306. In certain embodiments, the image 300 may include an indication of the eye gaze which would represent the focal point of the user's eyes. In certain embodiments, the eye gaze may be used to determine a foveated map as described herein. The foveated map may be used to determine a sensor readout that corresponds to the plurality of zones 302, 304, 306. As shown in FIG. 3, the image 300 has different resolutions for each zone. In zone 1 302, the resolution is 1:1. In zone 2 304, the resolution is 2:1 sub-sampled. In zone 3 306, the resolution is 4:1 sub-sampled. As shown, the further away from the center of the user's eye gaze, the lower the resolution of the output image. In certain embodiments, image 300 may represent the output image from the camera. The image 300 may be processed by a computing system to generate an output display image to present to a user of the computing system as described herein.

Figure 4A:
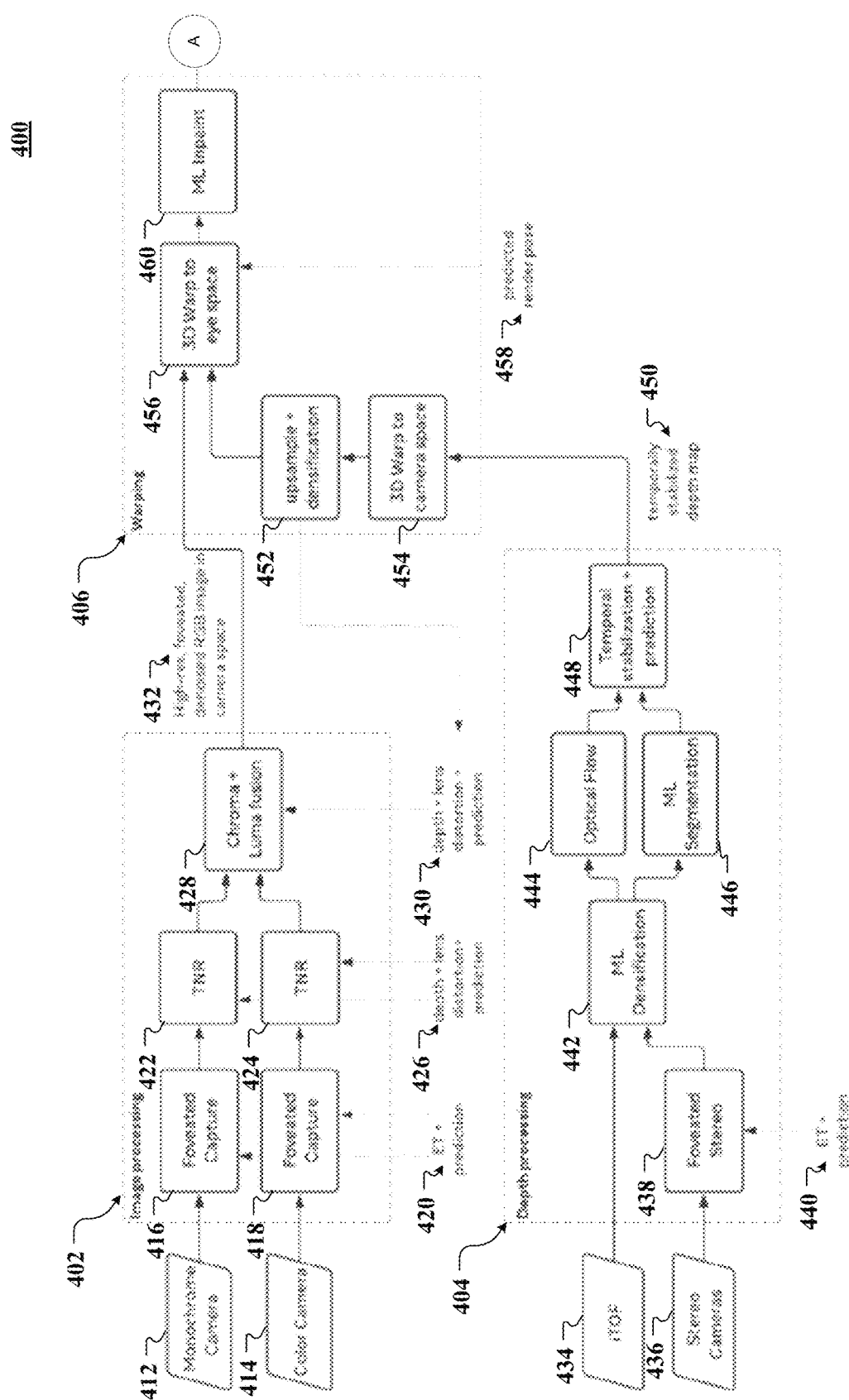
FIGS. 4A and 4B illustrate an example process of foveated region processing.
Figure 4B:
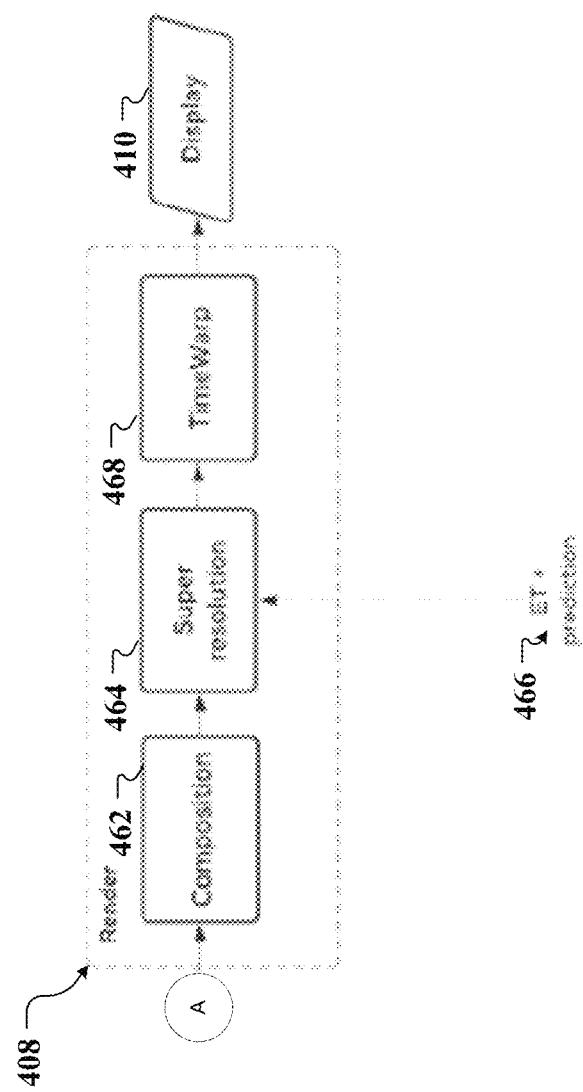

FIGS. 4A and 4B illustrate an example process of foveated region processing, in accordance with the presently disclosed embodiments. Referring to FIG. 4A, a process 400 of foveated region processing may be performed by a computing system as described herein. In certain embodiments, the process 400 may include camera image processing 402, depth processing 404, estimated views from eye locations 406, (shown in FIG. 4B), and displaying 410 (shown in FIG. 4B). In certain embodiments, the process 400 may simultaneously perform both camera image processing 402 and depth processing 404 or in any particular order. In certain embodiments, the process 400 may start with a monochrome camera 412 capturing a monochromatic image and a color camera 414 capturing an RGB image. The images captured by the monochrome camera and the color camera 414 may be sent to an ISP to be processed 402.

In certain embodiments, the computing system may perform eye tracking and determine a gaze of the user 420 that is used for foveated capture 416 and foveated capture 418 corresponding to a monochromatic image captured by the monochrome camera 412 and an RGB image captured by the color camera 414. The foveated capture 416 may generate a foveated map based on the determined gaze of the user 420 and use the generated foveated map to determine a sensor readout for the monochrome camera 412 as described herein. The output of the foveated capture 416 may be a reduced resolution monochromatic image. The foveated capture 418 may generate a foveated map based on the determined gaze of the user 420 and use the generated foveated map to determine a sensor readout for the color camera 414 as described herein. The output of the foveated capture 418 may be a reduced resolution RGB image. The foveated captures 416, 418 may output to a respective TNR 422, 424. The TNR 422, 424 may receive depth and lens distortion 426 to perform the TNR. The outputs of the TNR 422, 424 may be combined in a chroma and luma fusion 428. The chroma and luma fusion 428 may receive depth and distortion 430 to perform the chroma and luma fusion 428.

In certain embodiments, the depth and lens distortion 426 may be the same as depth and distortion 430. In certain embodiments, the chroma and luma fusion 428 may output a high-resolution, foveated, denoised RGB image in camera space 432 to be processed by the warping process 406. While only one set of monochrome camera 412 and color camera 414 is shown in this process 400, there may be additional sets of monochrome cameras 412 and color cameras 414 that are used to capture images that are used for camera image processing 402. As an example and not by way of limitation, a set of cameras may be used for each eye.

In certain embodiments, the indirect time-of-flight (iTOF) camera 434 may generate distance measurements to be used in depth processing 404. Although this disclosure describes using iTOF, this disclosure contemplates using direct time-of-flight (dTOF) or any time-of-flight technology. In certain embodiments, the stereo cameras 436 may capture stereoscopic images to be used in depth processing 404. In certain embodiments, the stereoscopic images may be sent to a foveated stereo process 438. The foveated stereo process 438 may receive a determined gaze of the user 440 (which may be the same as the determined gaze of the user 420). The foveated stereo process 438 may generate a foveated map to determine a sensor readout of each of the stereo cameras 436 as described herein. The output of the iTOF camera 434 and the foveated stereo process 438 are sent to a machine learning densification process 442.

The output of the ML densification process 442 are sent to an optical flow process 444 and a ML segmentation process 446. The outputs of the optical flow 444 and the ML segmentation process 446 are combined using temporal and stabilization 448 to generate a temporally stabilized depth map 450. The temporally stabilized depth map 450 goes through a 3D warp to camera space process 454. The output of the 3D warp to camera space process 454 goes through an upsample and densification process 452. The output of the upsample and densification process 452 is used for the depth and lens distortion 426, 430. The output of the upsample and densification process 452 is combined with the high-resolution, foveated, denoised RGB image in camera space 432 through a 3D warp to eye space process 456. The 3D warp to eye space process 456 may receive a render pose 458. The 3D warp to eye space process 456 warps the image to a baseline of the eyes of the user. The output of the 3D warp to eye space process 456 may be sent to an ML inpainting process 460. The ML inpainting process 460 corrects warping artifacts that appear from the warping process 406.

In certain embodiments, the output of the ML inpainting process 460 may be sent to the rendering process 408 as shown in FIG. 4B. The output of the ML inpainting process 460 may go through a composition process 462, where one or more virtual objects are rendered within the image. The composite image from the composition process 462 may then be placed through a super resolution process 464 where one or more super resolution techniques may be applied to the composite image. The super resolution process 464 may use a current updated gaze of the user 466 to perform one or more super resolution techniques.

For example, the super resolution process 464 may apply different super resolution techniques to the composite image to make the resolution of the entire image equal in one embodiment. In another embodiment, independent of whether foveation is used on cameras 412, 414, the super resolution process 464 may also include increasing the resolution beyond what is inputted and/or keep the same resolution but enhance the high spatial frequencies present in the image. For example, if there are different resolutions as a result from the foveated capture, the super resolution process 464 applies one or more super resolution techniques to increase the resolution of the composite image. The output of the super resolution process 464 is sent to a lens distortion and head rotation correction process 468 that performs lens distortion and head rotation correction based on user head pose and lens distortion. In certain embodiments, the image is displayed to one or more displays of the computing system in the display process 410. In certain embodiments, the process 400 may be performed for cameras for each eye of the user to render output images that correspond to a passthrough function.

One or more of the foregoing techniques may in some embodiments, include applying the super resolution process 464 in whole or selectively to the composite image. Specifically, as generally discussed above, super-resolution may be applied to the composite image. There are advantages to each of the following embodiments. For example, in one embodiment, the composite image may be generated and then super-resolution may be applied on the combined image (irrespective of layer). In another embodiment, the composite image may be generated and then super-resolution may be applied on the combined image, but selectively to frames and/or regions that have certain layers like passthrough. In one example, a solution may be to add a per-layer super-resolution block before generation of the composite image. Generating the composite image and then applying super-resolution may have the advantage of having a single place to apply super-resolution, but yet it applies to all content of the generated composite image. Similarly, generating the composite image and then applying super-resolution selectively to frames and/or regions has lower latency (e.g., from timewarp to display) and can have specialized algorithms depending on the layer type. Specifically, applying the super resolution process 464 in whole or selectively to all image frames or select image frames may be computationally-expensive and cause the XR display device 100 to consume comparatively more power. In accordance with the presently disclosed embodiments, it may be useful to provide a gaze-based super-resolution for image content rendered by XR display devices 100.

Figure 5:
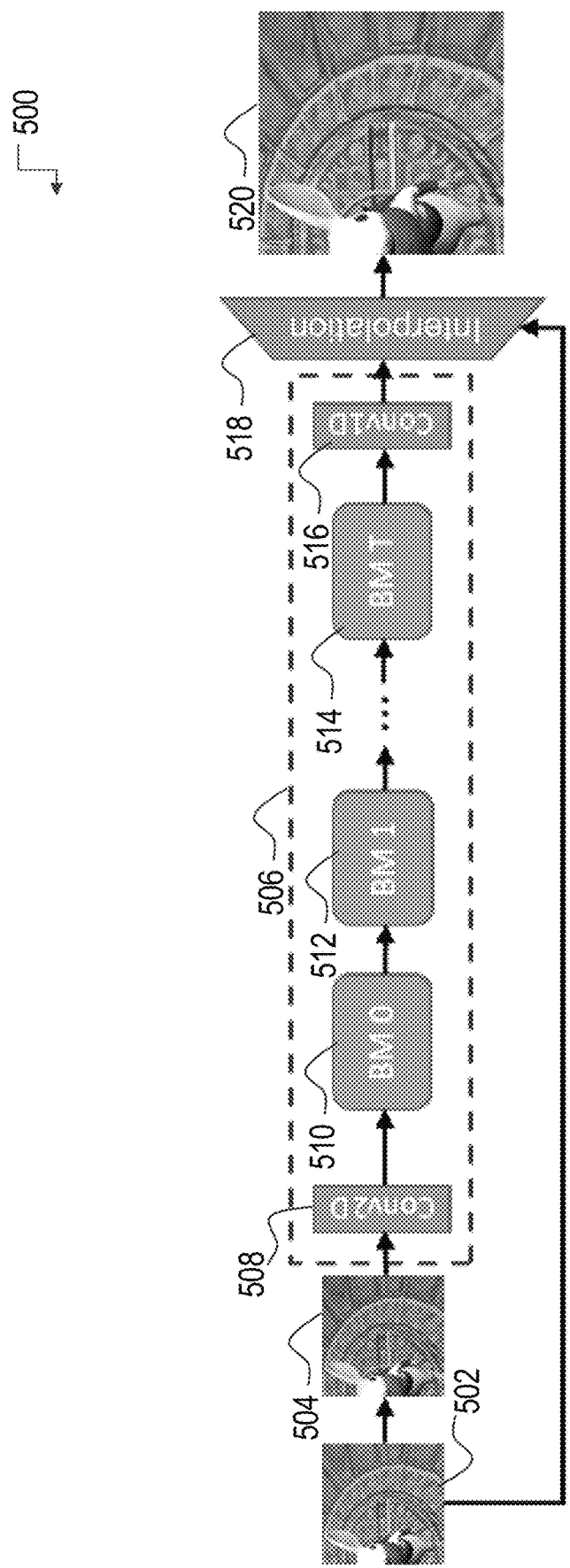
FIG. 5 illustrates a gaze-based super-resolution reconstruction model that may be suitable for providing gaze-based super-resolution for image content rendered by extended reality (XR) devices.

FIG. 5 illustrates a gaze-based super-resolution reconstruction model 500 that may be suitable for providing gaze-based super-resolution for image content rendered by extended reality (XR) devices, in accordance with the presently disclosed embodiments. In certain embodiments, the gaze-based super-resolution reconstruction model 500 may include a low-resolution RGB image 502 and a low-resolution monochrome image 504 being inputted into a super-resolution reconstruction model 506. In certain embodiments, as depicted by the gaze-based super-resolution reconstruction model 500 of FIG. 5, the low-resolution RGB image 502 and the low-resolution monochrome image 504 may be preprocessed by and inputted to a machine-learning model 506.

In certain embodiments, preprocessing the low-resolution RGB image 502 and the low-resolution monochrome image 504 may include normalizing and scaling the depth values and the color values of the low-resolution RGB image 502 and the low-resolution monochrome image 504, respectively. In certain embodiments, as further depicted by the gaze-based super-resolution reconstruction model 500 of FIG. 5, the low-resolution RGB image 502 and the low-resolution monochrome image 504 may be concatenated (e.g., stacked) and inputted into the machine-learning model 506. For example, in some embodiments, concatenating (e.g., stacking) the low-resolution RGB image 502 and the low-resolution monochrome image 504 and inputting the low-resolution RGB image 502 and the low-resolution monochrome image 504 into the machine-learning model 506 concurrently may reduce model complexity and execution time.

In certain embodiments, the machine-learning model 506 may include a convolutional neural network (CNN), a deep convolutional neural network (DCNN), a vision transformer (ViT), a generative adversarial network (GAN), or other similar deep neural network that may be suitable for encoding the low-resolution RGB image 502 and the low-resolution monochrome image 504 into one or more feature maps or a sequence of image patches that may be classified and utilized to generate a prediction of a high-resolution output image 520. For example, the machine-learning model 506 (e.g., CNN, DCNN, ViT, GAN, and so forth) may be trained to generate an estimation of a reconstructed high-resolution RGB image and monochrome image including both high-resolution monochrome information and RGB color information for particular regions of interest. Thus, in accordance with the presently disclosed techniques, the machine-learning model 506 (e.g., CNN, DCNN, ViT, GAN, and so forth) may be trained to reconstruct low-resolution RGB images and monochrome images into RGB images and monochrome images including high-resolution regions of interest based on an eye gaze of the user 102.

For example, as discussed, based on the low-resolution RGB image 502 and the low-resolution monochrome image 504, the machine-learning model 506 (e.g., CNN, DCNN, ViT, GAN, and so forth) may include one or more downsampling layers 508, which may generate one or more feature maps or a sequence of image patches based on the low-resolution RGB image 502 and the low-resolution monochrome image 504. Specifically, as further depicted by the gaze-based super-resolution reconstruction model 500 of FIG. 5, the downsampling layers 508 may generate as its prediction one or more sets of interpolation weights 510, 512, and 514 for each pixel in the low-resolution RGB image 502 and the low-resolution monochrome image 504 and corresponding to the high-resolution output image 520. For example, in one embodiment, if the high-resolution output image 520 has N×N pixels, the interpolation weights 510, 512, and 514 may represent 1000×1000 sets of interpolation weights (e.g., each set may have N interpolation parameters).

As previously noted, the machine-learning model 506 (e.g., CNN, DCNN, ViT, GAN, and so forth) will ultimately generate a prediction of a high-resolution reconstruction of the regions of interest of the low-resolution RGB image 502 and the low-resolution monochrome image 504 and corresponding to an area in which an eye gaze of the user 102 is directed or predicted to be directed within the next few or more image frames. In certain embodiments, as further depicted by the gaze-based super-resolution reconstruction model 500 of FIG. 5, the one or more sets of interpolation weights 510, 512, and 514 may be then provided to one or more upsampling layers 516 for upsampling and the output values may be inputted into an interpolation functional block 518. In certain embodiments, the interpolation functional block 518 may be any functional block suitable for algorithmically computing the color for each pixel for the high-resolution output image 520 by interpolating the downsampled output values. In one embodiment, the interpolation functional block 518 may algorithmically compute the color for each pixel of the regions of interest of the high-resolution output image 520.

In this way, the present embodiments may provide a gaze-based super-resolution for image content rendered by XR display devices 100. Specifically, by tracking the eye gaze of the user 102 and the image content being displayed by the XR display device 100 as the trigger for when to apply the gaze-based super-resolution reconstruction techniques as described herein, the gaze-based super-resolution reconstruction may be applied in the 30°×30° field of view (FOV) central foveal region and thus may be performed efficiently and reduce a power consumption of the XR display device 100. That is, the presently disclosed gaze-based super-resolution reconstruction techniques may be performed efficiently and reduce a power consumption of the XR display device 100, all the while rendering high-resolution images to the user 102. Thus, the present embodiments may apply different pixel scaling or image reconstruction techniques based on the content in the scene.

In certain embodiments, in addition to the machine-learning model 506 (e.g., CNN, DCNN, ViT, GAN, and so forth) being trained to reconstruct low-resolution RGB images and monochrome images into RGB images and monochrome images including high-resolution regions of interest based on an eye gaze of the user 102, the machine-learning model 506 (e.g., CNN, DCNN, ViT, GAN, and so forth) may be further trained to reconstruct low-resolution RGB images and monochrome images into RGB images and monochrome images including high-resolution regions of interest based on an object pose, for example, with respect to the image content being rendered and displayed by the XR display device 100. For example, in certain embodiments, the machine-learning model 506 (e.g., CNN, DCNN, ViT, GAN, and so forth) may identify regions of interest that include visually-interesting or visually-prominent image content to which the user 102 is likely to gaze. For example, the present gaze-based super-resolution reconstruction techniques may be applied, for example, to image content including persons, animals, faces of persons or animals, eyes of persons or animals, devices, multi-hued flowers, texts, logos, and so forth. Thus, the present embodiments may apply different pixel scaling or image reconstruction techniques based on an eye gaze of the user 102.

In certain embodiments, upsampling in accordance with the presently disclosed embodiments may be based on previously capture key-frames used for inpainting, or trained on a pre-captured model of the environment. Specifically, an MR pipeline for rendering passthrough images could be adapted to address disocclusion issues. Due to differences between the locations of passthrough cameras (e.g., the cameras used for capturing images that would be warped to generate passthrough images) and the user 102 eyes, the captured images may have missing information once they are warped to the viewpoint of the eyes of the user 102. Even if those cameras are placed as close to the user 102 eyes as possible, there will inevitably be differences. For example, when the scene includes foreground objects, such as the user 102 hand, the amount of background occluded by the foreground object would be noticeably different from the perspective of the passthrough cameras and the user 102 eyes. Consequently, when the image captured by the passthrough camera is reprojected to the user 102 eye position, certain portions of the background that were occluded by the foreground object in the captured image would become visible to the user 102, resulting in the aforementioned disocclusion problem.

In certain embodiments, the MR pipeline may address the disocclusion problem by leveraging scene information captured in previous frames. At a high level, the idea is to leverage previously captured images to provide information about the background scene that might be occluded in the current image capture. When the user 102 puts on the headset or starts a mixed-reality session, external cameras would capture images of the user 102 scene. A 3D reconstruction module may scan the user 102 environment, gathering image data and depth measurements. In certain embodiments, the image and depth data may be filtered to separate background from foreground objects. The image and depth data associated with the background may then be used to generate a 3D model (e.g., mesh) of the background, along with a corresponding texture atlas. With the 3D model and texture atlas, the rendering system would be able to synthesize an image of the background scene from a novel viewpoint. The pixel information of the background in that synthesized image may then be used to fill in the missing pixel information in the passthrough image.

In certain embodiments, instead of using past observations to build a 3D mesh model of the background environment, an MR pipeline may use previously captured RGBD keyframes for inpainting. A headset's cameras and depth sensors may capture RGBD (red, green, blue, and depth) information of the scene. A keyframe selection logic module may process RGBD images to select those that are suitable to be used for inpainting background content for subsequent frames. The selected RGBD images, which may be referred to as keyframes, are saved over time into a collection. Similar to the 3D mesh reconstruction of the background, the collection of keyframes represents historical observations of the background from different viewpoints. As such, each selected keyframe would ideally contain only background and no foreground objects. Thus, the keyframe selection logic module may be tasked with analyzing each incoming RGBD image and finding those that only contain background content. In some use cases, however, it may be difficult to find RGBD images that are free of foreground objects. As such, in particular embodiments, the criteria for selecting keyframes may be relaxed to also include RGBD images that predominantly include background content. The MR pipeline may use the collection of keyframes to render background information for a passthrough image from the perspective of the user 102 eye. The MR pipeline may use any suitable rendering technique, such as point-cloud-based rendering, neural volumetric rendering, unstructured Lumigraph rendering, etc., to render an image of the background using the collection of keyframes.

Past observations of the background—which may be represented using the aforementioned 3D reconstruction model or collection of keyframes—may be leveraged by the super-resolution process to improve the resolution and/or quality of the passthrough images. For example, when the MR pipeline determines that the user 102 gaze is focused on the background, the MR pipeline may improve the resolution of the region of interest by rendering corresponding pixel values using the 3D reconstruction model or keyframes. The MR pipeline may fuse the rendered pixel values with the final passthrough image in a variety of ways. For example, the rendered pixel values of the background and the low-resolution image capture may be jointly provided to the machine-learning model 506 (e.g., CNN, DCNN, ViT, GAN, and so forth) trained to take both types of information into account when generating a super-resolution output image 520. As another example, the rendered pixel values of the background may be used directly as the background of the passthrough image and/or composite image. In yet another example, the rendered pixel values of the background may be blended with the existing background of the passthrough image and/or composite image.

Figure 6A:
FIGS. 6A and 6B illustrate one or more image reconstruction examples 600A and 600B, respectively.
Figure 6B:

FIGS. 6A and 6B illustrate one or more image reconstruction examples 600A and 600B, respectively, in accordance with presently disclosed embodiments. Specifically, the present gaze-based super-resolution reconstruction techniques may be compared against existing pixel scaling or image reconstruction examples. For example, image 602 may include a low-resolution original image to be upscaled. In one embodiment, the image 602 may be upscaled in accordance with a nearest neighbor interpolation technique, resulting in image 604 (e.g., a blurry image). In another embodiment, the image 602 may be upscaled in accordance with a general super-resolution reconstruction technique, resulting in image 606. While the image 606 may be of higher resolution and image quality with respect to the image 604, applying the general super-resolution reconstruction technique in whole or in part to the image 602 may be computationally-expensive and cause the XR display device 100 to consume comparatively more power. Thus, in certain embodiments, the present gaze-based super-resolution reconstruction techniques may be applied to the image 602, resulting in image 608. As depicted, the present gaze-based super-resolution reconstruction techniques generate an image 608, which includes a high-resolution pixels for regions of interest of the image 602 (e.g., the area to which the eye gaze of the user 102 is directed) and low-resolution pixels for the remaining regions. Thus, the presently disclosed gaze-based super-resolution reconstruction techniques may be performed efficiently and reduce a power consumption of the XR display device 100, all the while rendering high-resolution images to the user 102.

Figure 7:
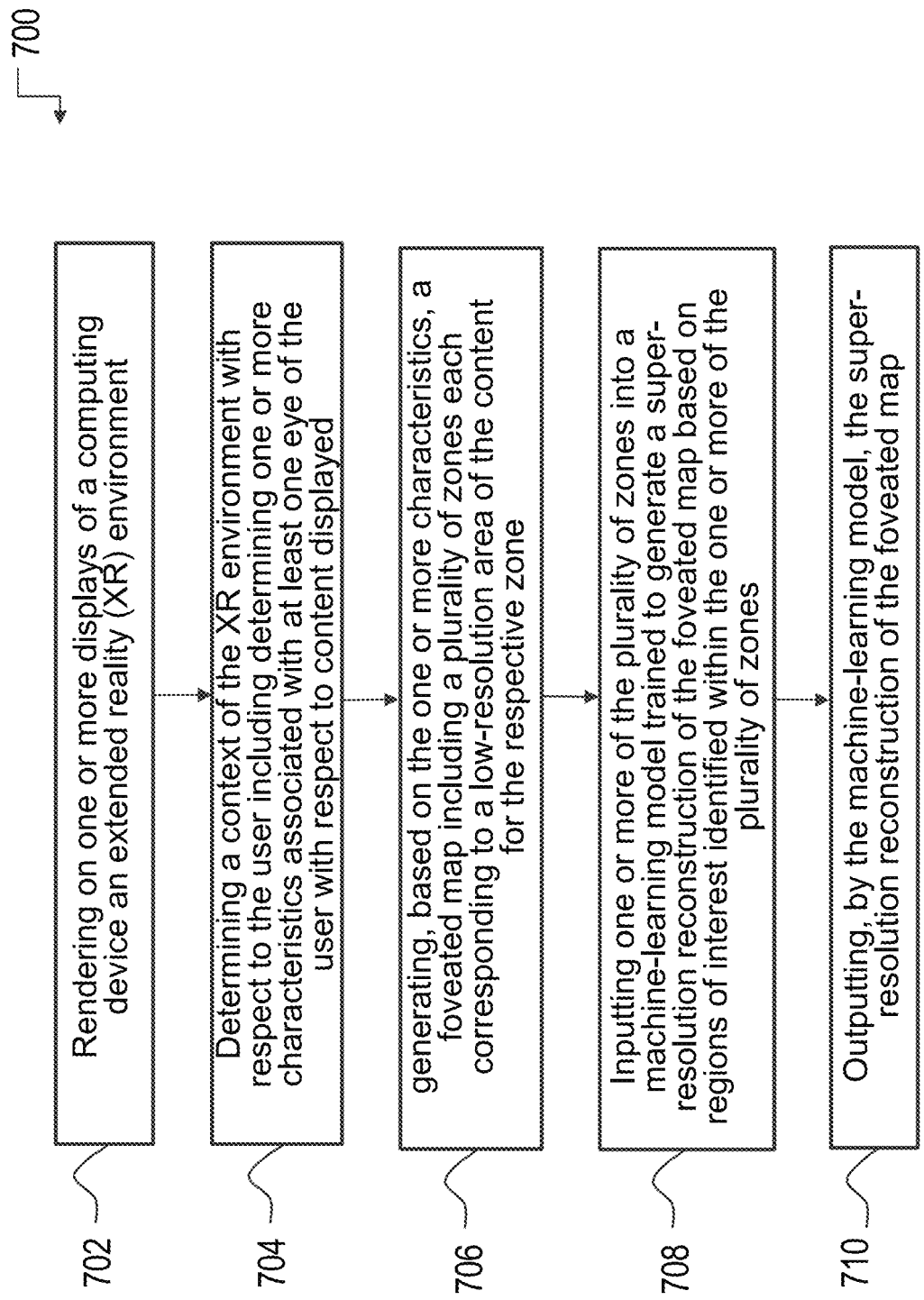
FIG. 7 illustrates a flow diagram of a method for providing gaze-based super-resolution for image content rendered by extended reality (XR) devices.

FIG. 7 illustrates a flow diagram of a method 700 for providing gaze-based super-resolution for image content rendered by extended reality (XR) devices, in accordance with presently disclosed embodiments. The method 700 may be performed utilizing one or more processing devices (e.g., XR display device 100) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 700 may begin at block 702 with one or more processing devices (e.g., XR display device 100) rendering on one or more displays of a computing device an extended reality (XR) environment. The method 700 may then continue at block 704 with the one or more processing devices (e.g., XR display device 100) determining a context of the XR environment with respect to the user. For example, in some embodiments, determining the context may include determining one or more characteristics associated with at least one eye of the user with respect to content displayed within the XR environment. The method 700 may then continue at block 706 with the one or more processing devices (e.g., XR display device 100) generating, based on the one or more characteristics associated with the at least one eye of the user, a foveated map. For example, in one embodiment, the foveated map may include a number of foveal regions, which may include, for example, a number of zones each corresponding to a low-resolution area of the content for the respective zone.

The method 700 may then continue at block 708 with the one or more processing devices (e.g., XR display device 100) inputting one or more of the plurality of zones into a machine-learning model trained to generate a super-resolution reconstruction of the foveated map based on regions of interest identified within the one or more of the plurality of zones. The method 700 may then conclude at block 710 with one or more processing devices (e.g., XR display device 100) outputting, by the machine-learning model, the super-resolution reconstruction of the foveated map. For example, the XR display device 100 may then display one or more image frames utilizing the super-resolution reconstruction of the foveated map.

Figure 8:
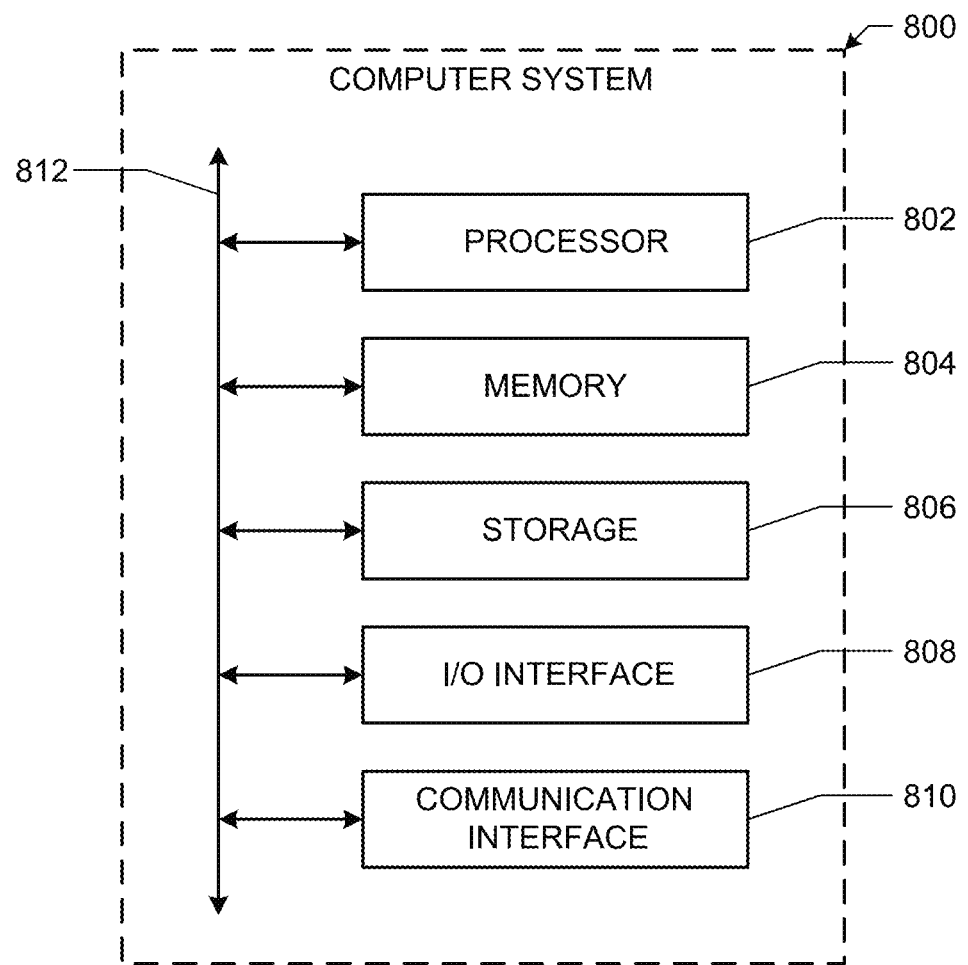
FIG. 8 illustrates an example computer system.

FIG. 8 illustrates an example computer system 800 that may be useful in performing one or more of the forgoing techniques as presently disclosed herein. In certain embodiments, one or more computer systems 800 perform one or more steps of one or more methods described or illustrated herein. In certain embodiments, one or more computer systems 800 provide functionality described or illustrated herein. In certain embodiments, software running on one or more computer systems 800 performs one or more steps of one or more methods described or illustrated herein or provides functionality described or illustrated herein. Certain embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate. In certain embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In certain embodiments, processor 802 includes hardware for executing instructions, such as those making up a computer program. As an example, and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In certain embodiments, processor 802 may include one or more internal caches for data, instructions, or addresses. This disclosure contemplates processor 802 including any suitable number of any suitable internal caches, where appropriate. As an example, and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802.

Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In certain embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In certain embodiments, memory 804 includes main memory for storing instructions for processor 802 to execute or data for processor 802 to operate on. As an example, and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In certain embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere).

One or more memory buses (which may each include an address bus and a data bus) may couple processor 802 to memory 804. Bus 812 may include one or more memory buses, as described below. In certain embodiments, one or more memory management units (MMUs) reside between processor 802 and memory 804 and facilitate accesses to memory 804 requested by processor 802. In certain embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In certain embodiments, storage 806 includes mass storage for data or instructions. As an example, and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In certain embodiments, storage 806 is non-volatile, solid-state memory. In certain embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In certain embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In certain embodiments, communication interface 810 includes hardware, software, or both providing one or more interfaces for communication (such as, for example, packet-based communication) between computer system 800 and one or more other computer systems 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 810 for it.

As an example, and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In certain embodiments, bus 812 includes hardware, software, or both coupling components of computer system 800 to each other. As an example, and not by way of limitation, bus 812 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method, comprising, by a computing device configured to be worn by a user:
    rendering on one or more displays of the computing device an extended reality (XR) environment;
    determining a context of the XR environment with respect to the user, wherein determining the context comprises determining one or more characteristics associated with at least one eye of the user with respect to content displayed within the XR environment;
    generating, based on the one or more characteristics associated with the at least one eye of the user, a foveated map, wherein the foveated map comprises a plurality of foveal regions, and wherein the plurality of foveal regions comprises a plurality of zones each corresponding to a low-resolution area of the content for the respective zone;
    inputting one or more of the plurality of zones into a machine-learning model trained to generate a super-resolution reconstruction of the foveated map based on regions of interest identified within the one or more of the plurality of zones; and
    outputting, by the machine-learning model, the super-resolution reconstruction of the foveated map.

2. The method of claim 1, further comprising:
    causing the XR display device to display one or more image frames utilizing the super-resolution reconstruction of the foveated map.

3. The method of claim 1, further comprising determining the context of the XR environment with respect to the user based on a prediction of a location of at least one eye of the user with respect to the content over a next few image frames to be displayed.

4. The method of claim 1, wherein determining the context of the XR environment with respect to the user comprises determining one or more of a head pose of the user, an eye gaze of the user, or a depth from eye vector convergence.

5. The method of claim 1, wherein the machine-learning model is further trained to generate a multi-frame temporal super-resolution reconstruction of the foveated map based on the regions of interest identified within the one or more of the plurality of zones, the multi-frame temporal super-resolution reconstruction being applied to reconstruct textural details of the foveated map.

6. The method of claim 1, wherein the one or more of the plurality of zones corresponds to an approximate 30°×30° field of view (FOV) central foveal region of the user.

7. The method of claim 1, wherein the machine-learning model comprises a convolutional neural network (CNN), a deep convolutional neural network (DCNN), a vision transformer (ViT), or generative adversarial network (GAN).

8. A computing device configured to be worn by a user, comprising:
    one or more displays;
    one or more non-transitory computer-readable storage media including instructions; and
    one or more processors coupled to the one or more displays, the one or more processors configured to execute the instructions to:
        render on the one or more displays of the computing device an extended reality (XR) environment;
        determine a context of the XR environment with respect to the user, wherein determining the context comprises determining one or more characteristics associated with at least one eye of the user with respect to content displayed within the XR environment;
        generate, based on the one or more characteristics associated with the at least one eye of the user, a foveated map, wherein the foveated map comprises a plurality of foveal regions, and wherein the plurality of foveal regions comprises a plurality of zones each corresponding to a low-resolution area of the content for the respective zone;
        input one or more of the plurality of zones into a machine-learning model trained to generate a super-resolution reconstruction of the foveated map based on features of interest within the one or more of the plurality of zones; and output, by the machine-learning model, the super-resolution reconstruction of the foveated map.

9. The computing device of claim 8, wherein the instructions further comprise instructions to:
cause the computing device to display one or more image frames utilizing the super-resolution reconstruction of the foveated map.

10. The computing device of claim 8, wherein the instructions further comprise instructions to determine the context of the XR environment with respect to the user based on a prediction of a location of at least one eye of the user with respect to the content over a next few image frames to be displayed.

11. The computing device of claim 8, wherein the instructions to determine the context of the XR environment with respect to the user further comprise instructions to determine one or more of a head pose of the user, an eye gaze of the user, or a depth from eye vector convergence.

12. The computing device of claim 8, wherein the machine-learning model is further trained to generate a multi-frame temporal super-resolution reconstruction of the foveated map based on the regions of interest identified within the one or more of the plurality of zones, the multi-frame temporal super-resolution reconstruction being applied to reconstruct textural details of the foveated map.

13. The computing device of claim 8, wherein the one or more of the plurality of zones corresponds to an approximate 30°×30° field of view (FOV) central foveal region of the user.

14. The computing device of claim 8, wherein the machine-learning model comprises a convolutional neural network (CNN), a deep convolutional neural network (DCNN), a vision transformer (ViT), or generative adversarial network (GAN).

15. A non-transitory computer-readable medium comprising instructions that, when executed by one or more processors of a computing device configured to be worn by a user, cause the computing device to:
render on one or more displays of the computing device an extended reality (XR) environment;
determine a context of the XR environment with respect to the user, wherein determining the context comprises determining one or more characteristics associated with at least one eye of the user with respect to content displayed within the XR environment;
generate, based on the one or more characteristics associated with the at least one eye of the user, a foveated map, wherein the foveated map comprises a plurality of foveal regions, and wherein the plurality of foveal regions comprises a plurality of zones each corresponding to a low-resolution area of the content for the respective zone;
input one or more of the plurality of zones into a machine-learning model trained to generate a super-resolution reconstruction of the foveated map based on features of interest within the one or more of the plurality of zones; and
output, by the machine-learning model, the super-resolution reconstruction of the foveated map.

16. The non-transitory computer-readable medium of claim 15, wherein the instructions further comprise instructions to:
cause the computing device to display one or more image frames utilizing the super-resolution reconstruction of the foveated map.

17. The non-transitory computer-readable medium of claim 15, wherein the instructions further comprise instructions to determine the context of the XR environment with respect to the user based on a prediction of a location of at least one eye of the user with respect to the content over a next few image frames to be displayed.

18. The non-transitory computer-readable medium of claim 15, wherein the instructions to determine the context of the XR environment with respect to the user further comprise instructions to determine one or more of a head pose of the user, an eye gaze of the user, or a depth from eye vector convergence.

19. The non-transitory computer-readable medium of claim 15, wherein the one or more of the plurality of zones corresponds to an approximate 30°×30° field of view (FOV) central foveal region of the user.

20. The non-transitory computer-readable medium of claim 15, wherein the machine-learning model comprises a convolutional neural network (CNN), a deep convolutional neural network (DCNN), a vision transformer (ViT), or generative adversarial network (GAN).

* * * * *